United States Patent Office 3,754,003
Patented Aug. 21, 1973

3,754,003
TETRAMETHYL PYRROLIDINE DERIVATIVES
Andrea Pedrazzoli and Leone Dall Asta, both of
Via Piranesi 38, Milan, Italy
No Drawing. Continuation-in-part of abandoned application Ser. No. 777,470, Nov. 20, 1968. This application July 8, 1971, Ser. No. 112,599
Int. Cl. C07d 27/04
U.S. Cl. 260—326.5 R       9 Claims

ABSTRACT OF THE DISCLOSURE

New tetramethylpyrrolidino-derivatives of the general formula

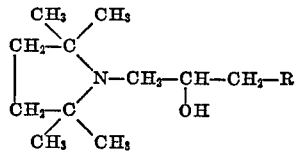

wherein R is a phenoxy or phenyl-alkyloxy radical, optionally substituted in the benzene ring; and their therapeutically acceptable acid addition salts, are useful as local anaesthetic agents having a very low acute toxicity.

CROSS-REFERENCES TO RELATED APPLICATIONS

This application is a continuation-in-part of application Ser. No. 777,470 filed on Nov. 20, 1968 now abandoned.

BRIEF SUMMARY OF THE INVENTION

The present invention relates to novel tetramethyl-pyrrolidino derivatives having the following general formula:

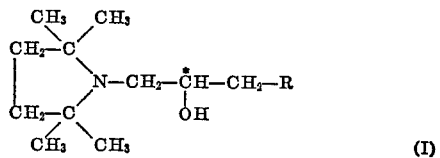

wherein R is a phenoxy or phenyl (lower) alkoxy radical, which may have 1 or 2 substituents in the benzene ring, which may be the same or different, selected from chloro, lower alkyl and lower alkoxy; and to pharmaceutically acceptable acid addition salts thereof.

The novel compounds of this invention possess a remarkable pharmacological activity, in particular they are useful as local anaesthetic agents.

In this connection, particularly preferred compounds are those of Formula I above, in which R represents a phenoxy group substituted by one or two methyl groups.

The compounds of the present invention have an asymmetrical carbon atom and, therefore, they can be present in optically active form. The racemates, as such, possess a high degree of activity, but the (—) form is preferred. Particularly useful compound is (—)1-(o-toloxy)-3-(2′,2′,5′,5′-tetramethyl-pyrrolidin-1′-yl)-propan-2-ol.

DETAILED DESCRIPTION OF THE INVENTION

The term "lower alkyl," as used herein, includes straight or branched, saturated aliphatic hydrocarbon radicals of from 1 to 4 carbon atoms, such as methyl, ethyl, propyl, isopropyl, n-butyl, isobutyl; with the term "lower alkoxy" is intended an hydroxyl in which the hydrogen atom is replaced by a lower alkyl group, as hereinabove defined.

The asterisk (*) in the Formula I indicates the asymmetrical carbon atom. The symbols (+) and (—) are used to designate the optical isomers and refer to the direction of rotation of polarized light by the isomers. These symbols are used in preference to the designation "dextro" and "laevo" because these latter are used to indicate the absolute optical configuration. The symbol (±) is used to designate the racemates.

The compounds of this invention are prepared by reacting tetramethylpyrrolidine with the appropriate epoxide according to the following reaction scheme:

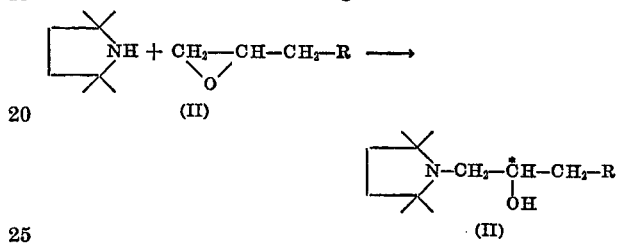

in which R has the above-stated meaning.

The reaction is carried out in a polar solvent, such as in a straight or branched chain, saturated or unsaturated aliphatic alcohol containing 1 to 7 carbon atoms, at a temperature in the range from 75 to 175° C., preferably from 138 to 157° C., for a period of from 4 to 24 hours, preferably of 15 to 22 hours.

Preferred reaction solvents are n-amyl and n-hexyl alcohol, but a lower alkanol may also be used. If methanol is chosen as a solvent, it is preferred to carry out the reaction in an autoclave.

The end compounds which are object of this invention are isolated as racemates according to procedures well known in the art, for example by evaporating the solvent and recovering the final product by distillation, preferably under reduced pressure, or by filtration. The compounds can be purified, by crystallization, in the form of salts with organic or inorganic acids.

The racemic bases thus obtained can be resolved according to methods well known in the art in order to isolate the (—) form which is particularly preferred. To this purpose the racemic free base is reacted under heating with an appropriate optically active organic acid in its (+)form, for example with (+)O,O-di(p-toluoyl)-tartaric acid, in an inert organic solvent such as diethyl ether.

The diastereoisomeric salt which separates in crystalline form upon cooling is removed by filtration and treated with an alkali hydroxide, such as sodium or ammonium hydroxide, to split the diastereoisomeric salt into the desired (—) free base. The latter can be isolated according to usual methods and, if desired, converted into its therapeutically acceptable acid addition salts.

When they are not the final products of the reaction, the therapeutically acceptable acid addition salts of the compound of Formula I, which are a further object of this invention, can be prepared in any conventional manner. Exemplary pharmaceutically acceptable acid addition salts are those formed with acetic, maleic, fumaric, succinic, tartaric, citric, malic, cinnamic, sulfonic, hydrochloric, hydrobromic, hydriodic, sulfuric, phosphoric and nitric acids, the hydrochlorides being particularly preferred.

The products used as intermediates in the preparation of the compounds of the invention are already known or can easily be prepared according to methods well known in the art.

The products of the invention are stable to light and heat and have a remarkable pharmacological activity, in particular a good local anaesthetic activity.

In Table I there are reported the results obtained by testing some representative compounds of Formula I above in the test of the infiltration anaesthesia in guinea pigs according to the method of E. Bulbring and I. Wajda (J. Pharmacol. Exptl. Ther. 85, 78; 1945). In the third column there is indicated the concentration which gives the 100% of anaesthesia during 15 minutes (effective concentration 100:$EC_{100}$).

TABLE I
Compounds of Formula I [(±)-form]

| Product of Example | R | $EC_{100}$ (percent) |
|---|---|---|
| 2 | —O—$C_6H_5$ | 0.25 |
| 1 | 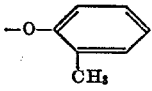 | 0.05 |
| 7 | 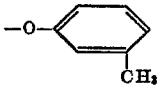 | 0.25 |
| 6 | 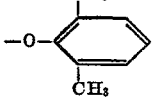 | 0.1 |
| 3 | 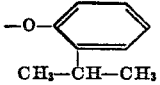 | 0.1 |
| 9 | 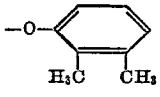 | 0.05 |
| 10 | 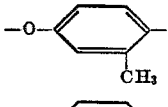 | 0.1 |
| 11 | 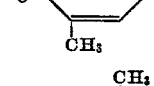 | 0.1 |
| 12 | 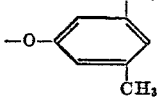 | 0.05 |
| 13 | 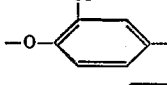 | 0.1 |
| 4 | 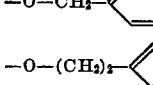 | 0.25 |
| 14 | 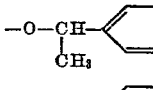 | 0.1 |
| 15 | 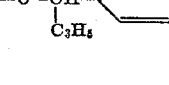 | 0.25 |
| 16 |  | 0.25 |

TABLE I—Continued

| Product of Example | R | $EC_{100}$ (percent) |
|---|---|---|
| 17 |  | 0.25 |
| 19 | 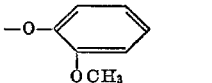 | 0.1 |

From this table it appears that the compounds of the present invention exhibit a remarkable local anaesthetic activity.

Table II reports the relative local anaesthetic activity of some compounds of the present invention in respect to the activity of lidocaine, which is considered one of the best local anaesthetics known so far. The activity and duration of action of lidocaine in the different tests used for comparison purpose have been given the standard value of 1.

TABLE II

[Comparison between the (±) form of compounds of Formula I above, in which R has the meaning given below, and lidocaine]

| R | $DL_{50}$ (subcutaneous) mg./kg. | Infiltration anaesthesia in guinea pigs [1] | Surface anaesthesia on rabbit eye [2] | Conduction anaesthesia in rats [3] |
|---|---|---|---|---|
| (R group, 4-CH3 phenoxy) | 1,100 | 3 | 32 | 3 |
| (R group, 3-CH3 phenoxy) | 750 | 1 | 14 | 1.5 |
| (R group, 2,3-diCH3 phenoxy) | 1,200 | 3 | 30 | 2 |
| (R group, 3,5-diCH3 phenoxy) | 1,000 | 3 | 5 | 1 |
| Lidocaine | 337 | 1 | 1 | 1 |

[1] Bulbring E., Wajda I.—J. Pharmacol. Exptl. Ther. 85, 78 (1945)
[2] Regner J.—Bull. Sci. Pharm. 30,580, 646 (1923).
[3] Shackel L.F.—Anaesthesia and Analgesia 14, 20 (1935); Setnikar I.—Arzneimittelforschung 16, 1025 (1966).

Finally, a representative compound of the invention, i.e. (±)1 - (o - toloxy)-3-(2',2',5',5'-tetramethyl-pyrrolidin-1'-yl)-propan-2-ol hydrochloride described in Example 1 below, has been tested, for its local anaesthetic activity, in comparison with the corresponding tetrademethyl-derivative disclosed by Kurikara et al. (Chemical Abstracts 64, 12664a; 1966); i.e. 1-pyrrolidin-1'-yl-3-(o-toloxy)-propan-2-ol (compound No. 4 of the C.A. table).

The local anaesthetic activity was determined on the basis of the infiltration anaesthesia in guinea pigs according to the method of Bulbring and Wajda (J. Pharmacol.Exptl.Ther. 85, 78; 1945). The compounds under examination were injected at concentrations of 0.5–0.25–0.125–0.0625 and 0.0317 percent and the percent of the anaesthetized animals after 5, 10, 15, 20, 25, 30, 45 and 60 minutes was recorded.

The results obtained at the different concentrations are summarized in Table III below. As usual, the index of the local anaesthetic activity is given by the effective concentration ($EC_{100}$), i.e. the substance concentration which produces full anaesthesia (in 100% of the animals) for 15 minutes.

TABLE III

| Compound | Concentration (percent) | Percent of anaesthetized animals after— | | | | | | | | $EC_{100}$ (percent) |
|---|---|---|---|---|---|---|---|---|---|---|
| | | 5 min. | 10 min. | 15 min. | 20 min. | 25 min. | 30 min. | 45 min. | 60 min. | |
| 1-pyrrolidin-1'-yl-3-(o-toloxy)-propan-2-ol HCl | 0.5 | 80 | 60 | 60 | 20 | 20 | 20 | 0 | 0 | >0.5 |
| 1-(2',2',5',5'-tetramethyl-pyrrolidin-1'-yl)-3-(o-toloxy)-propan-2-ol HCl (±) form | 0.5 | 100 | 100 | 100 | 100 | 100 | 100 | 100 | 100 | 0.0317 |
| | 0.25 | 100 | 100 | 100 | 100 | 100 | 100 | 100 | 100 | |
| | 0.125 | 100 | 100 | 100 | 100 | 100 | 100 | 100 | 100 | |
| | 0.0625 | 100 | 100 | 100 | 100 | 100 | 100 | 90 | 80 | |
| | 0.0317 | 100 | 100 | 100 | 90 | 80 | 70 | 40 | 10 | |

From this table it appears that at a concentration of 0.5% the compound of the reference does not show a satisfactory activity, while at a concentration more than 10 fold lower the compound of the invention shows good local anaesthetic activity.

The compounds of this invention show a good local tolerance. A number of compounds has been subjected to proofs of subchronic toxicity in rates at doses even higher than those which are significant from the pharmacological, experimental and clinical standpoint. No significant change in the normal parameters studied has been observed, namely: behaviour of the weight curve, complete haemochromocytometric examination, and clinical chemical examination. Some compounds have been used, and have proved to be without veterinary clinical disadvantages, to induce infiltration anaesthesia, conduction anaesthesia and spinal anaesthesia, during various general surgical and stomatological operations.

In order to illustrate the invention, the following examples are given in a non-limitative way.

Example 1

A mixture of 116 g. of 2,2,5,5-tetramethyl-pyrrolidine and 163 g. of 1-(o-toloxy)-2,3-epoxy-pjropane in 270 ml. n-amyl alcohol was heated at 140° C. for 20 hours. After cooling and concentration in vacuo, the residue was distilled to obtain (±)-1-(o-toloxy)-3-(2',2',5',5'-tetramethyl-pyrrolidin-1'-yl)-propan-2-ol having a boiling point of 160°–165° C./0.1 mm. Hg. By treating this product with hydrochloric acid in isopropanol, a compound was obtained which, when crystallised from isopropanol, gave 225 g. (overall yield of the preparation: 78% of theory) of (±)1-(o-toloxy)-3-(2',2',5',5'-tetramethyl-pyrrolidin-1'-yl)-propan-2-ol hydrochloride melting at 189°; 191° C.

Elementary analysis for $C_{18}H_{30}ClNO_2$ (mol. wt. 327.88).—Calculated (percent): C, 65.97; H, 9.15; N, 4.27; Cl, 10.82. Found (percent): C, 65.69; H, 9.11; N, 4.27; Cl, 10.87.

Analogously, by treating, under the same conditions, the free base with maleic acid or hydrogen bromide the corresponding maleate or hydrobromide were obtained.

By treating 2,2,5,5-tetramethyl-pyrrolidine with the reactants indicated in the second column of the following table under the conditions set forth in Example 1, the compounds listed in the third column of the same table, and their hydrochlorides, were obtained.

TABLE IV

| Ex. | Reactant | Final product [(±) form] |
|---|---|---|
| 2 | 1-phenoxy-2-3-epoxypropane. | 1-phenoxy-3-(2',2',5',5'-tetramethyl-pyrrolidin-1'-yl)-propan-2-ol. |
| 3 | 1-(o-isopropyl-phenoxy)-2,3-epoxy-propane. | 1-(o-isopropyl-phenoxy)-3-(2',2',5',5'-tetramethyl-pyrorlidin-1'-yl)-propan-2-ol. |
| 4 | 1-(benzyloxy)-2,3-epoxy-propane. | 1-(benzyloxy)-3-(2',2',5',5'-tetramethyl-pyrrolidin-1'-yl)-propan-2-ol. |
| 5 | 1-(2',5'-dimethyl-phenoxy)-2,3-epoxypropane. | 1-(2',5'-dimethyl-phenoxy)-3-(2',2',5',5'-tetramethyl-pyrrolidin-1'-yl)-propan-2-ol. |
| 6 | 1-(2',6'-dimethyl-phenoxy)-2,3-epoxypropane. | 1-(2',6'-dimethyl-phenoxy)-3-(2',2',5',5'-tetramethyl-pryrolidin-1'-yl)-propan-2-ol. |
| 7 | 1-(m-toloxy)-2,3-epoxypropane. | 1-(m-toloxy)-3-(2',2',5',5'-tetramethyl-pyrrolidin-1'-yl)-propan-2-ol. |
| 8 | 1-(p-chloro)-phenoxy-2,3-epoxy-propane. | 1-(p-chloro)-phenoxy-3-(2',2',5',5'-tetramethyl-pyrrolidin-1'-yl)-propan-2-ol. |
| 9 | 1-(2',3'-dimethyl)-phenoxy-2,3-epoxypropane. | 1-(2',3'-dimethyl)-phenoxy-3-(2',2',5',5'-tetramethyl-pyrrolidin-1'-yl)-propan-2-ol. |
| 10 | 1-(3',4'-dimethyl)-phenoxy-2,3-epoxypropane. | 1-(3',4'-dimethyl)-phenoxy-3-(2',2',5',5'-tetramethyl-pyrrolidin-1'-yl)-propan-2-ol. |
| 11 | 1-(2',4'-dimethyl)-phenoxy-2,3-epoxypropane. | 1-(2',4'-dimethyl)-phenoxy-3-(2',2',5',5'-tetramethyl-pyrrolidin-1'-yl)-propan-2-ol. |
| 12 | 1-(3',5'-dimethyl)-phenoxy-2,3-epoxypropane. | 1-(3',5'-dimethyl)-phenoxy-3-(2',2',5'5'-tetramethyl-pyrrolidin-1'-yl)-propan-2-ol. |
| 13 | 1-(2',4'-dichloro)-phenoxy-2,3-epoxypropane. | 1-(2',4'-dichloro)-phenoxy-3-(2',2',5',5'-tetramethyl-pyrrolidin-1'-ly)-propan-2-ol. |
| 14 | 1-(2'-phenyl)-ethoxy-2,3-epoxy-propane. | 1-(2'-phenyl)-ethoxy-3-(2',2',5',5'-tetramethyl-pyrrolidin-1'yl)-propan-2-ol. |
| 15 | 1-(1'-phenyl)-ethoxy-2,3-epoxy-propane. | 1-(1'-phenyl)-ethoxy-3-(2',2',5',5'-tetramethyl-pyrrolidin-1'-yl)-propan-2-ol. |
| 16 | 1-(1'-phenyl)-propoxy-2,3-epoxy-propane. | 1-(1'-phenyl)-propoxy-1-(2',2',5',5'-tetramethyl-pyrrolidin-1'yl)-propan-2-ol. |
| 17 | 1-(p-toloxy)-2,3-epoxy-propane. | 1-(p-toloxy)-3-(2',2',5',5'-tetramethyl-pyrrolidin-1'-yl)-propan-2-ol. |
| 18 | 1-(p-methoxy)-phenoxy-2,3-epoxy-propane. | 1-(p-methoxy)-phenoxy-3-(2',2',5',5'-tetramethyl-pyrrolidin-1'-yl)-propan-2-ol. |
| 19 | 1-(o-methoxy)-phenoxy-2,3-epoxy-propane. | 1-(o-methoxy)-phenoxy-3-(2',2',5',5'-tetramethyl-pyrrolidin-1'-yl)-propan-2-ol. |
| 20 | 1-(p-ethoxy)-phenoxy-2,3-epoxy-propane. | 1-(p-ethoxy)-phenoxy-3-(2',2',5',5'-tetramethyl-pyrrolidin-1'yl)-propan-2-ol. |
| 21 | 1-(p-butoxy)-phenoxy-2,3-epoxy-propane. | 1-(p-butoxy)-phenoxy-3-(2',2',5',5'-tetramethyl-pyrrolidin-1'-yl)-propan-2-ol. |

Example 22

To a solution of 0.2 mole (±)-1-(o-toloxy)-3-(2,2',5',5'-tetramethyl-pyrrolidin-1'-yl)-propan-2-ol in 100 ml. diethyl ether 0.1 mole (±)-O,O-di-(p-toluyl)-tartaric acid in 100 ml. diethyl ether was added. After 30 minutes at reflux the solution was cooled and the crystalline precipitate was collected by filtration. 65 g. of a crude product was obtained, which, after two recrystallizations from ethanol yielded 41 g. of pure (−)1-(o-toloxy)-3-(2',2',5',5'-tetramethyl-pyrrolidin-1' - yl) - propan - 2ol (±)-(p-toluyl)-tartaric acid addition salt; M.P. 116–120° C., $[\alpha]_D^{25} = -77.5°$ (chloroform, c.=1%). The diastero-isomeric salt thus obtained was suspended in water and treated with 28% ammonium hydroxide to yield (−) 1 - (o - toloxy) - 3 - (2',2',5',5'-tetramethyl-pyrrolidin-1'-yl)-propan-2-ol, which was extracted with diethyl ether. The ethereal solution was then treated with gaseous hydrogen chloride to obtain pure (−)-1-(o-toloxy)-3-(2',2',5',5' - tetramethyl - pyrrolidin-1'-yl)-propan-2-ol hydrochloride; M.P. 178–180° C., $[\alpha]_D^{25} = -32°$ (water, c.=1%).

In an analogous manner, the racemic compounds described in Example 3–21 were resolved and their (−)form was isolated.

We claim:
1. A compound selected from the group consisting of
(a) a tetramethylpyrrolidino derivative having the formula

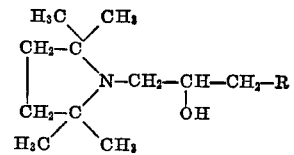

wherein R is a phenoxy or phenyl (lower) alkoxy radical, which may have 1 or 2 substituents in the benzene ring, which may be the same or different, selected from chloro, lower alkyl and lower alkoxy; and (b) a pharmaceutically acceptable acid addition salt thereof.

2. The (—)form of a compound according to claim 1.

3. (±)1 - (o - toloxy) - 3 - (2',2',5',5'-tetramethyl-pyrrolidin-1'-yl)-propan-2-ol hydrochloride.

4. (±)1 - (m - toloxy) - 3 - (2',2',5',5')-tetramethyl-pyrrolidin-1'-yl)-propan-2-ol hydrochloride.

5. (±)1 - (2',6' - dimethyl) - phenoxy-3-(2',2',5',5'-tetramethyl - pyrrolidin-1'-yl)-propan-2-ol hydrochloride.

6. (±)1 -(2',3' - dimethyl) - phenoxy-3-(2',2',5',5'-tetramethyl - pyrrolidin-1'-yl)-propan-2-ol hydrochloride.

7. (—)1 - (o - toloxy) - 3 - (2',2',5',5'-tetramethyl-pyrrolidin-1'-yl)-propan-2-ol hydrochloride.

8. A compound according to claim 1 wherein R is a phenoxy group containing one or two methyl groups attached to the benzene ring.

9. A compound according to claim 2 wherein R is a phenoxy group containing one or two methyl groups attached to the benzene ring.

References Cited
UNITED STATES PATENTS 3,501,769  3/1970  Crowther et al. ____ 260—501.17

U.S. Cl. X.R.

JOSEPH A. NARCAVAGE, Primary Examiner

260—326.5 M; 424—274

UNITED STATES PATENT OFFICE
CERTIFICATE OF CORRECTION

Patent No. 3,754,003          Dated August 21, 1973

Inventor(s) Andrea Pedrazzoli et al.

It is certified that error appears in the above-identified patent and that said Letters Patent are hereby corrected as shown below:

In the Heading: after "Via Piranesi 38, Milan, Italy" add

--assignors to Centre De Recherches Marcel Miday, Paris

France, a corporation of France--

In the Heading: after "July 8, 1971, Ser. No. 112,599" add

--Claim priority application, Great Britain, November 21, 1967, 52,985/67--

Column 2, line 25, change "(II)" to --(I)--

Column 5, line 18, change "rates" to --rats--;

line 34, change "pjropane" to --propane--;

line 62, change "2-3" to --2,3--;

line 64, change "pyrorlidin" to --pyrrolidin--;

line 70, change "pryrolidin" to --pyrrolidin--.

Column 6, line 42, change "(2,2',"  to --(2',2',--;

line 44, change "(+)" to --(+)--;

line 50, change "2ol" to --2-ol--;

line 51, change "(+)" to --(+)--;

line 52, change "diastero-" to --diastereo--.

Signed and sealed this 11th day of February 1975.

(SEAL)
Attest:

RUTH C. MASON
Attesting Officer

C. MARSHALL DANN
Commissioner of Patents
and Trademarks